US010800353B2

(12) United States Patent
Seegert et al.

(10) Patent No.: US 10,800,353 B2
(45) Date of Patent: Oct. 13, 2020

(54) UTILITY VEHICLE POWERTRAIN ENCLOSURE

(71) Applicant: DEERE & COMPANY

(72) Inventors: Brian D. Seegert, Horicon, WI (US); Vilas Chaudhari, Shahada (IN); Sandeep Burli, Shahada (IN)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 16/169,129

(22) Filed: Oct. 24, 2018

(65) Prior Publication Data
US 2020/0130612 A1 Apr. 30, 2020

(51) Int. Cl.
*B60R 13/08* (2006.01)
*B60K 5/12* (2006.01)
*B62D 21/18* (2006.01)
*B62D 25/08* (2006.01)

(52) U.S. Cl.
CPC ........ *B60R 13/0838* (2013.01); *B60K 5/1208* (2013.01); *B60R 13/0884* (2013.01); *B62D 21/183* (2013.01); *B62D 25/088* (2013.01)

(58) Field of Classification Search
CPC ............ B60R 13/0838; B60R 13/0884; B60K 5/1208; B62D 25/088; B62D 21/183
See application file for complete search history.

(56) References Cited

U.S. PATENT DOCUMENTS

| 3,796,277 | A | | 3/1974 | Gordon | |
|---|---|---|---|---|---|
| 3,884,322 | A | * | 5/1975 | Nemschoff | B62D 49/0664 181/204 |
| 3,982,600 | A | * | 9/1976 | Gerresheim | B60R 13/0838 180/69.21 |
| 4,071,009 | A | * | 1/1978 | Kraina | B60R 13/0838 123/198 E |
| 4,114,714 | A | * | 9/1978 | Fachbach | B60K 11/00 180/68.1 |
| 4,141,427 | A | * | 2/1979 | Kirchweger | B60R 13/0838 180/69.22 |
| 4,854,278 | A | * | 8/1989 | Honecker | B60K 11/02 123/198 E |
| 4,889,203 | A | | 12/1989 | Hagarty | |
| 6,167,976 | B1 | | 1/2001 | O'Neill et al. | |
| 6,202,777 | B1 | | 3/2001 | Surridge | |
| 7,617,903 | B2 | * | 11/2009 | Byers | A63H 17/262 180/291 |
| 8,596,405 | B2 | | 12/2013 | Sunsdahl et al. | |
| 2004/0229019 | A1 | * | 11/2004 | Tilton | B32B 3/04 428/172 |
| 2015/0060184 | A1 | * | 3/2015 | Golbs | B60K 5/1208 180/68.4 |
| 2015/0237795 | A1 | | 8/2015 | Koch et al. | |
| 2018/0056772 | A1 | * | 3/2018 | Teraoka | B60K 5/1216 |
| 2018/0118134 | A1 | * | 5/2018 | Komiya | B60R 13/0838 |
| 2018/0334199 | A1 | * | 11/2018 | Ueno | B62D 33/03 |

(Continued)

*Primary Examiner* — Karen Beck

(57) ABSTRACT

A utility vehicle powertrain enclosure includes an engine and a transmission mounted to a carrier under a utility vehicle cargo box and substantially enclosed by the carrier and a plurality of panels. The carrier has a forward end pivotably attached to a frame member of the utility vehicle, and sides flexibly connected to panels alongside the engine, and a rearward end mounted to the utility vehicle with a pair of suspension members.

11 Claims, 4 Drawing Sheets

(56) References Cited

U.S. PATENT DOCUMENTS

2019/0143808 A1* 5/2019 Oba .................. B60K 13/04
                                                    180/309
2019/0300071 A1* 10/2019 St-Pierre ............. B62D 21/183

* cited by examiner

UTILITY VEHICLE POWERTRAIN ENCLOSURE

FIELD OF THE INVENTION

This invention relates to off-road and recreational utility vehicles, and more specifically to a utility vehicle powertrain enclosure for sound reduction.

BACKGROUND OF THE INVENTION

Sound levels from an off-road or recreational utility vehicle powertrain may be between about 70 dBA and 90 dBA during normal use. In the past, sound reduction efforts have included muffler/exhaust system design, engine air intake routing, and sound absorbing materials. However, these efforts may not be sufficient to comply with sound ordinances and restrictions in residential areas or on golf courses. There is a need for additional sound reduction for off-road and recreational utility vehicles that is low in cost and may be installed easily on the vehicle.

SUMMARY OF THE INVENTION

A utility vehicle powertrain enclosure includes a plurality of panels secured together under a utility vehicle cargo box including a front panel, a rear panel, a top panel, a left side panel, and a right side panel. The utility vehicle powertrain also includes a carrier supporting an engine and a transmission. The carrier has a forward end pivotably mounted to a frame of the utility vehicle and a rearward end mounted to a plurality of suspension members. A plurality of flexible transition members are attached between the carrier and the side panels.

DESCRIPTION OF THE PREFERRED EMBODIMENT

Figure 1:
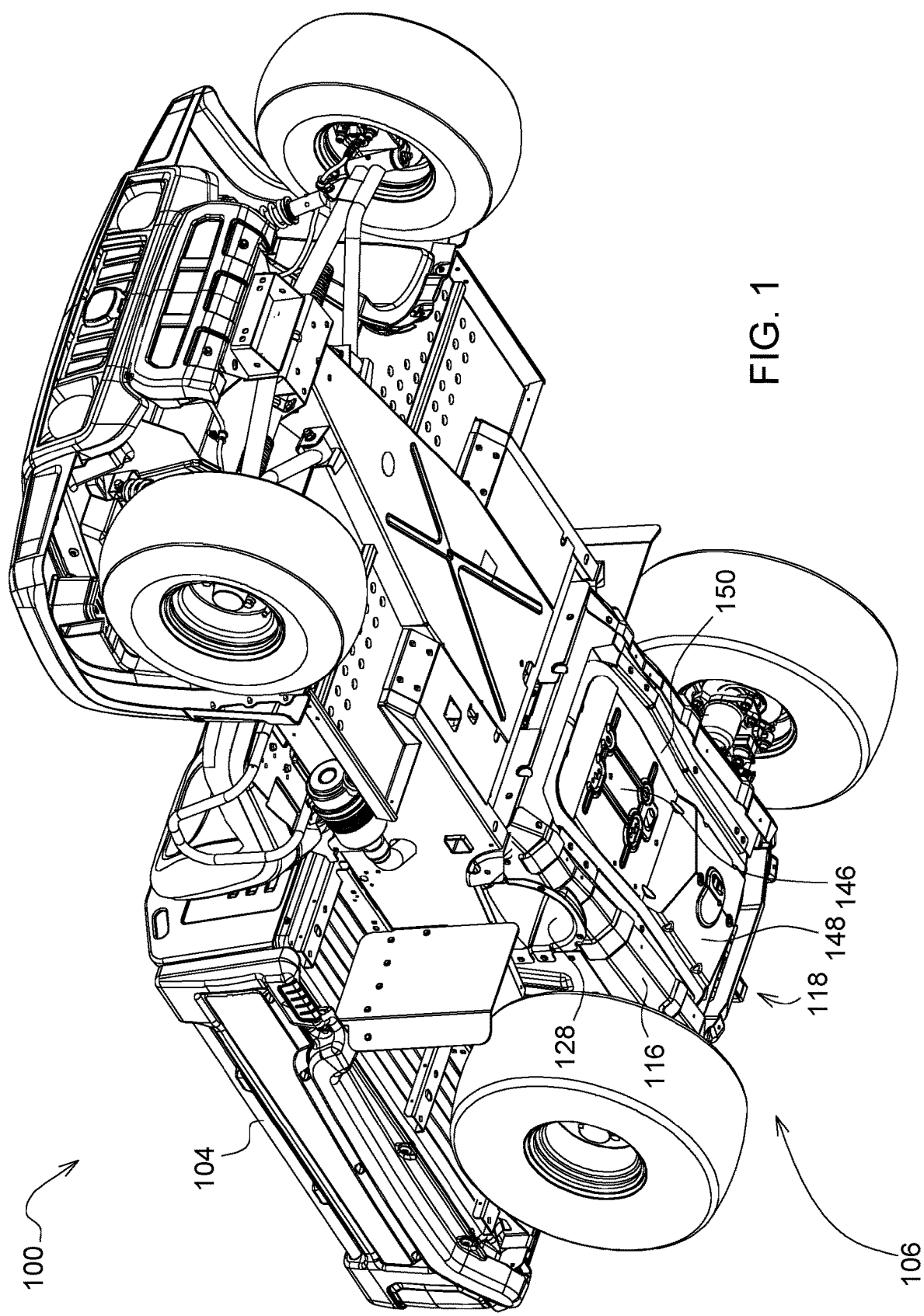
FIG. 1 is a bottom perspective view of a recreational or off-road utility vehicle with a powertrain enclosure according to a first embodiment of the invention.
Figure 2:
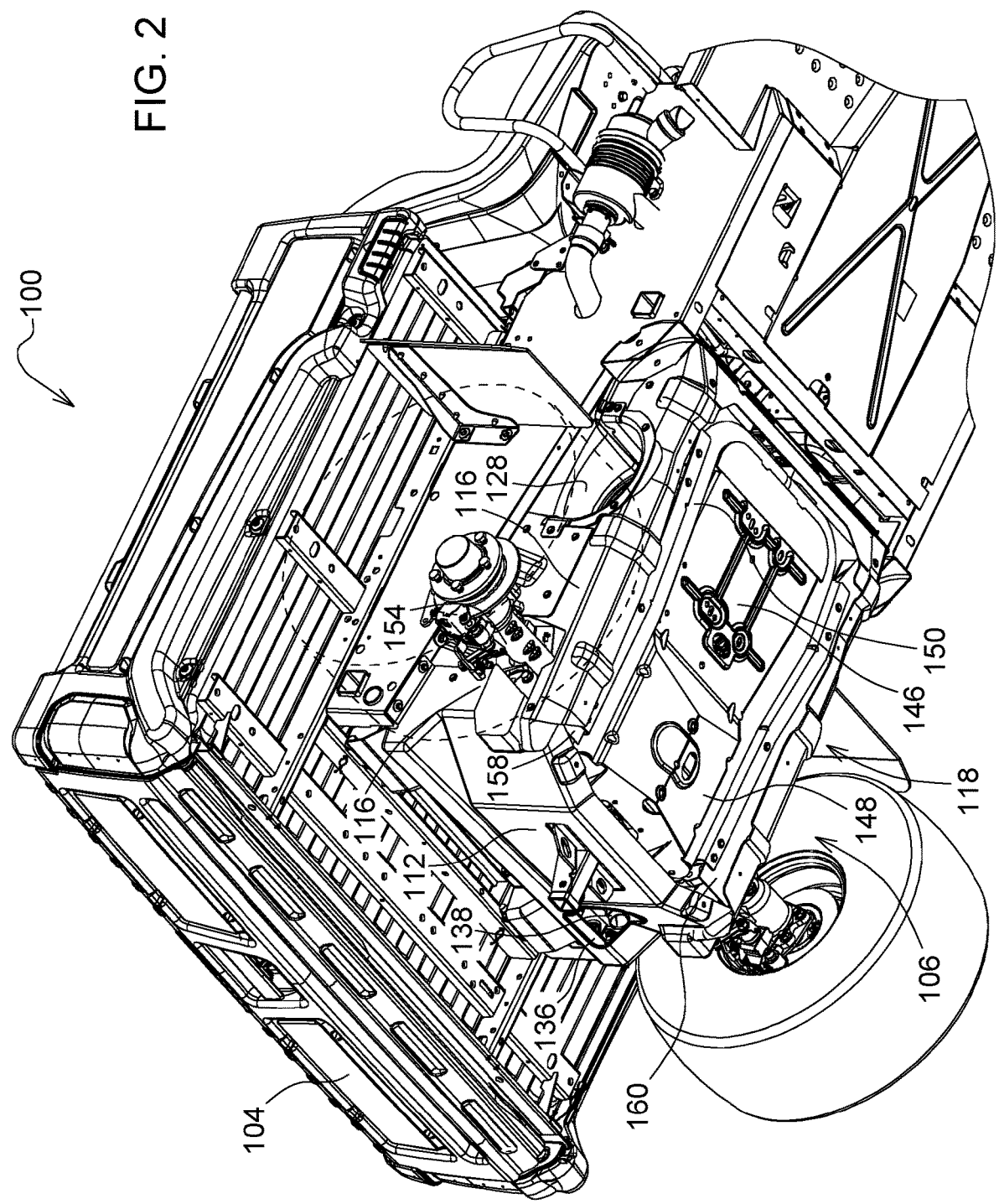
FIG. 2 is a bottom perspective view of a utility vehicle powertrain enclosure in a first position according to a first embodiment of the invention.
Figure 3:
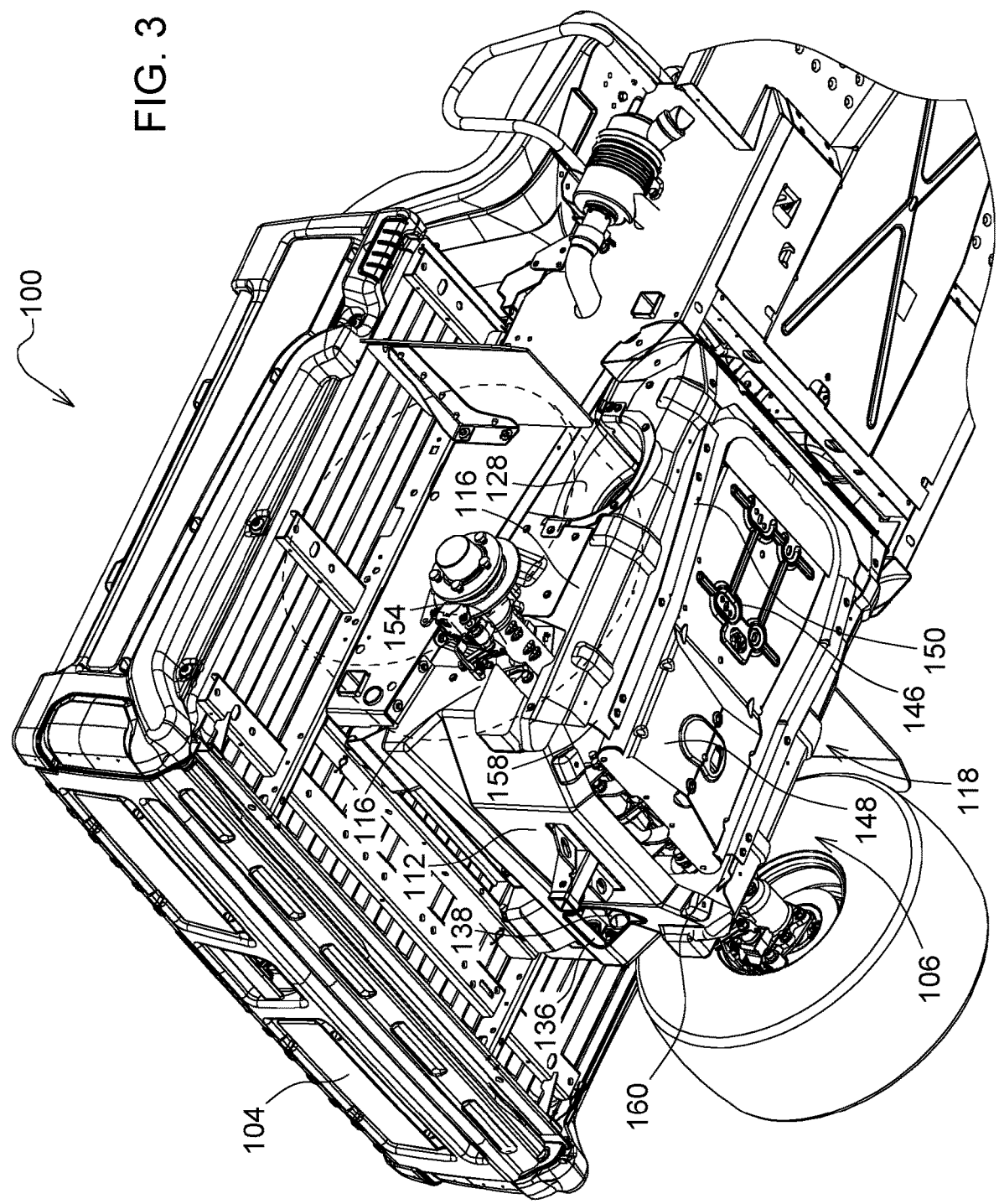
FIG. 3 is a bottom perspective view of a utility vehicle powertrain enclosure in a second position according to a first embodiment of the invention.
Figure 4:
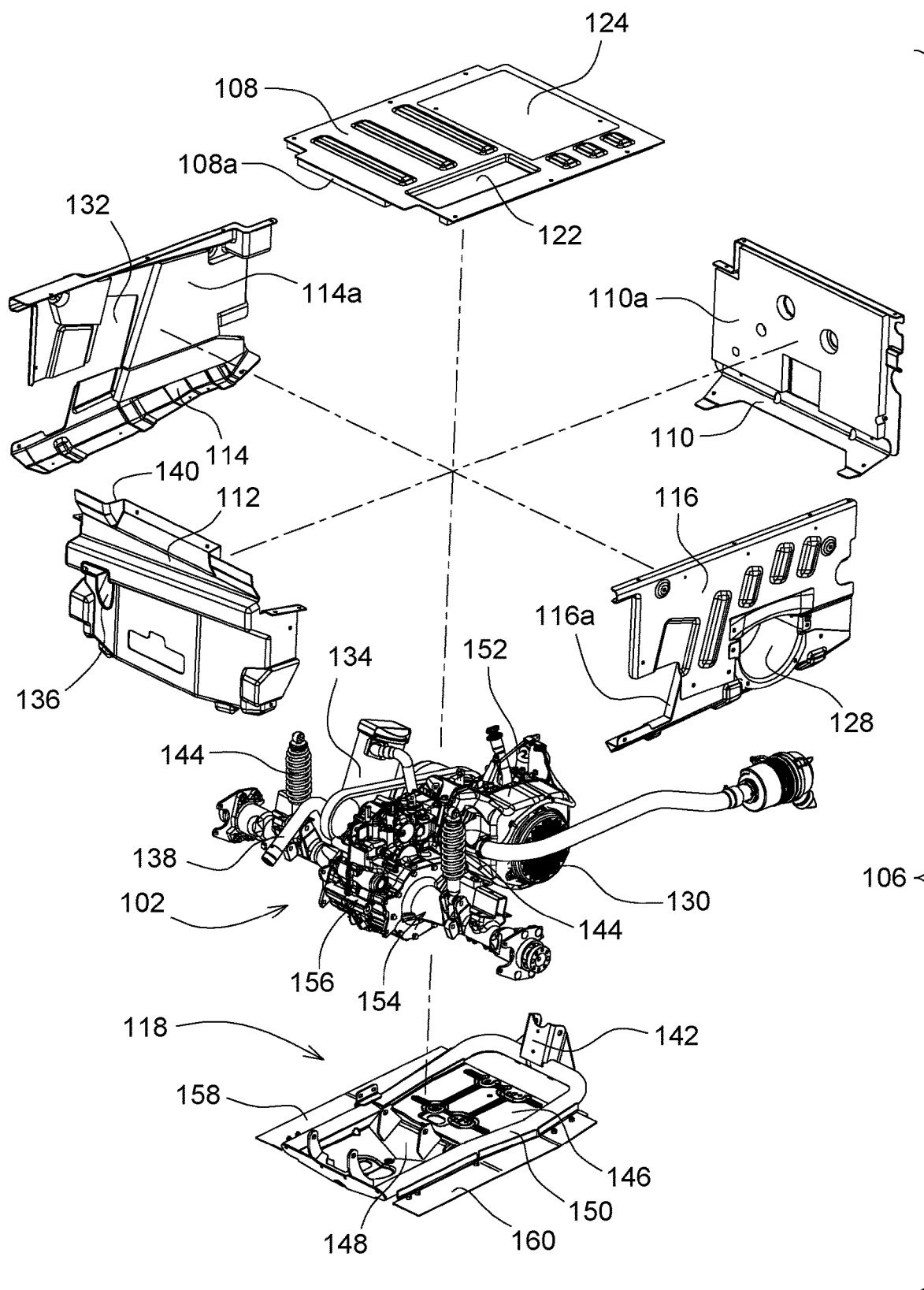
FIG. 4 is an exploded perspective view of a utility vehicle powertrain enclosure according to a first embodiment of the invention.

In one embodiment shown in FIGS. 1-4, off-road or recreational utility vehicle 100 may include isolated powertrain 102 positioned under cargo box 104. Powertrain enclosure 106 encloses the isolated powertrain, and may be secured to the underside of the cargo box or integrated into the bottom of the cargo box. The powertrain enclosure may include a plurality of high density polyethylene panels 108-116 that may be joined together at their edges to form a box structure, along with carrier 118 which pivotably supports the isolated powertrain and encloses or covers the underside of the powertrain enclosure. The panels may include top panel 108, front and rear panels 110, 112, and left and right side panels 114, 116. Alternatively, the powertrain enclosure may include the bottom of the cargo box instead of top panel 108. Each of the panels may be high density polyethylene, and the edges of the panels may be joined or fastened together with threaded fasteners or clips. A layer of sound absorbing foam 108a, 110a, 114a, 116a, preferably having a thickness of about 25 mm, may be adhered or applied to the inner surface of panels 108, 110, 114 and 116.

In one embodiment, powertrain enclosure 106 may have a plurality of openings through one or more panels 108-116. For example, cargo bed support opening 122 may be provided in top panel 108. Removable service cover opening 124 also may be provided in top panel 108. Engine air inlet opening 128 may be generally cylindrical or semi-cylindrical tube provided through right side panel 116. The engine air inlet opening may extend into the powertrain enclosure where it may provide airflow to shroud 130 of the engine air intake fan. Muffler opening 132 may be provided in left side panel 114 to provide clearance and air circulation around muffler 134 which may be mounted to the engine and positioned inside the powertrain enclosure. Exhaust opening 136 may be provided through rear panel 112 for tail pipe 138. Air exit opening 140 may be a slot-shaped opening in the upper left corner of rear panel 112, to help air flow from the powertrain enclosure, in addition to air exiting through muffler opening 132.

In one embodiment, powertrain enclosure 106 may include carrier 118 which pivotably supports isolated powertrain 102 and encloses or covers the underside of the powertrain enclosure. The forward end of the carrier may be pivotably connected with hinge 142 to the frame of the off-road or recreational utility vehicle under a forward end of the cargo box, and the rear of the carrier may be connected to the frame with two or more suspension members such as coil springs 144. For example, carrier 118 may pivot between the first or higher position shown in FIG. 2 and the second or lower position shown in FIG. 3. The carrier may include one or more sheet metal plates 146, 148 supported by a rigid perimeter frame structure 150. For example, the carrier may include front plate 146 which may support engine 152, and rear plate 148 which may support transmission 154 and transaxle 156. The rigid perimeter frame structure may be a hollow steel tube welded to the perimeter of the plates. Transition flaps 158, 160 may be provided between the sides of the carrier and left and right side panels 114, 116. The transition flaps may be flexible material such as rubber that covers the gaps between the sides of carrier and the side panels as the carrier pivots with the suspension members.

Having described the preferred embodiment, it will become apparent that various modifications can be made without departing from the scope of the invention as defined in the accompanying claims.

The invention claimed is:

1. A utility vehicle powertrain enclosure, comprising:
   a plurality of panels secured together under a utility vehicle cargo box including a front panel, a rear panel, a top panel, a left side panel, and a right side panel; and
   a carrier covering an underside of an engine and a transmission and having a forward end pivotably mounted to a frame of the utility vehicle under a forward end of the cargo box and a rearward end mounted to a plurality of suspension members; and a plurality of flexible transition flaps between the carrier and the side panels covering any gaps therebetween as the carrier pivots with the suspension members.

2. The utility vehicle powertrain enclosure of claim 1 further comprising at least one air exit opening through at least one panel of the powertrain enclosure.

3. The utility vehicle powertrain enclosure of claim 1 wherein the carrier includes a first plate supporting the engine, a second plate supporting the transmission, and a rigid perimeter frame structure around the first plate and the second plate.

4. The utility vehicle powertrain enclosure of claim 1 further comprising a layer of sound absorbing foam on the inner surface of each of the panels.

5. The utility vehicle powertrain enclosure of claim 1 further comprising an engine air intake extending from one of the panels to an air intake shroud of the engine.

6. A utility vehicle powertrain enclosure, comprising:
a box-shaped structure mounted below a cargo box and having a pivoting carrier with an underside which supports an engine and a transmission inside the box-shaped structure;
an air intake opening extending inwardly from the box-shaped structure to an engine air intake; and
a plurality of flexible transition members between the pivoting carrier and a plurality of high density polyethylene panels.

7. The utility vehicle powertrain enclosure of claim 6 wherein the pivoting carrier has a first end that is hinged and a second end that is connected to a pair of suspension members.

8. A utility vehicle powertrain enclosure, comprising:
an engine and a transmission supported by a carrier under a utility vehicle cargo box and substantially enclosed by the carrier and a plurality of panels; the carrier having a forward end pivotably attached to a frame member of the utility vehicle, and having flaps flexibly connected in a gap on each side of the carrier that rides with a pair of suspension members.

9. The utility vehicle powertrain enclosure of claim 8 wherein the engine includes a muffler substantially enclosed by the carrier and the plurality of panels, and a muffler opening in one of the panels for air flow around the muffler.

10. The utility vehicle powertrain enclosure of claim 8 wherein the transmission includes a transaxle.

11. The utility vehicle powertrain enclosure of claim 8 wherein the carrier includes a pair of sheet metal plates and a substantially rigid perimeter structure.

\* \* \* \* \*